Sept. 9, 1947.  A. P. DINSMORE  2,427,125
SYNCHRONIZING DEVICE
Filed Jan. 24, 1946

Inventor
Albert P. Dinsmore
By
Attorneys

Patented Sept. 9, 1947

2,427,125

UNITED STATES PATENT OFFICE 2,427,125

SYNCHRONIZING DEVICE

Albert P. Dinsmore, Dayton, Ohio, assignor to General Motors Corporation, Detroit, Mich., a corporation of Delaware Application January 24, 1946, Serial No. 643,156

2 Claims. (Cl. 250—41.5)

This invention relates to synchronizing or pulse generating means and more particularly to synchronizing means operated by photographic apparatus to control means which is to form a portion of the photograph to be taken and relates to my copending application, Serial No. 643,155, filed January 24, 1946.

There are of course many instances in which it is desirous of having certain operations carried out while the camera shutter is closed and to take exposures of certain equipment after the operations have been carried out and to synchronize the same with camera operation automatically. In the present case the means described in the copending application above-mentioned provides an inertialess apparatus for determining engine shaft R. P. M. in which case successive photographic records of the same are made by a motion picture camera, the determinations of said R. P. M. being made during the time the shutter on the camera is closed. It is therefore necessary to provide some means on the camera which is capable of imparting a pulse to a control line when the shutter closes.

It is therefore an object of my invention to provide pulse generating means operated by the camera shutter.

It is a further object of my invention to provide camera operated synchronizing means which is easily applicable to a conventional camera with substantially no change in the latter's construction.

It is a still further object of my invention to provide an electronic light actuated synchronizing means for camera operation.

With these and other objects in view which will become apparent as the specification proceeds, my invention will be best understood by reference to the following specification and claims and the illustrations in the accompanying drawings, in which:

Figure 1:
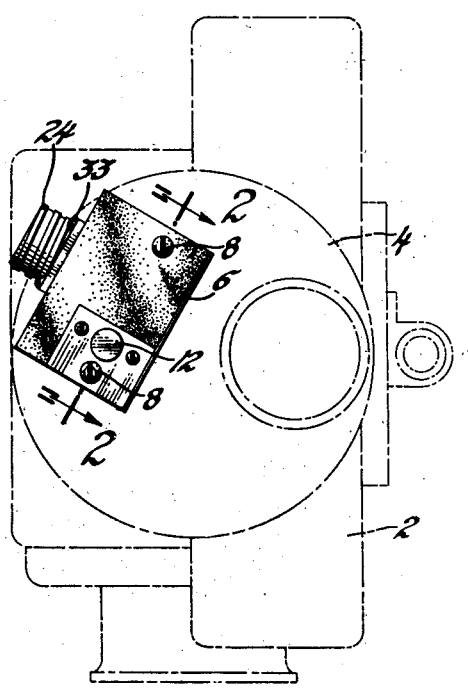
Figure 1 is an elevational view of a camera showing the synchronizing device of my invention applied thereto.
Figure 2:
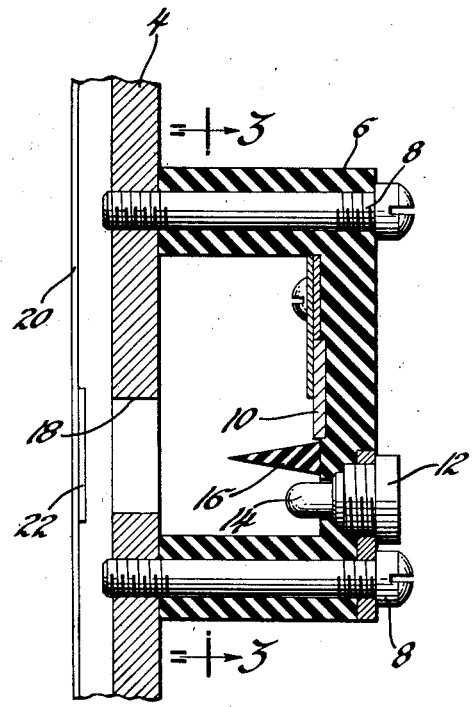
Figure 2 is an enlarged sectional view of the switching means taken on line 2—2 of Figure 1.
Figure 3:
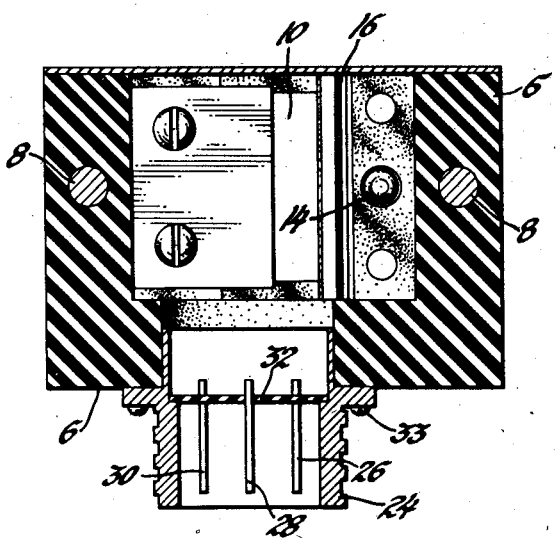
Figure 3 is a sectional view taken on line 3—3 of Figure 2.
Figure 4:
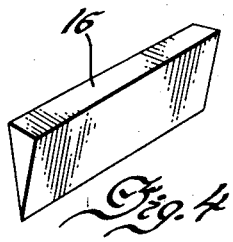
Figure 4 is a perspective view of the pyramidal shielding means between the light source and cell.

Referring now more particularly to Figures 1 and 2 there is shown in dot and dash line a conventional motion picture camera 2 and mounted on the front plate 4 thereof is an insulating block 6 held thereto by suitable bolts 8. The insulated block 6 is hollow and secured to its inner surface is a light sensitive cell 10 such as a selenium cell and in spaced relation thereto there is provided on a threaded cap 12 a small electric bulb 14, the assembly being capable of threading into the block 6 with the source of illumination in the interior thereof. Suitable electric connection can be made to this bulb to energize the same. Between the photo-electric cell 10 and the source 14 there is rigidly secured by adhesive means a pyramidal blocking member 16 to prevent light rays from passing directly from the source of illumination 14 to the photo-electric cell 10. The front plate 4 of the camera is provided with an opening 18 and the rotating shutter 20 of the camera is provided on its forward surface with a reflecting sector 22 so that once per revolution and at the instant when the reflecting surface 22 aligns itself with the opening 18, light rays impinging on the reflecting surface 22 will be reflected to the photo-electric cell 10 but during the remainder of the rotation of the shutter the light rays will be absorbed by the surface of the shutter 20 and will not be reflected to energize the cell.

Thus, once per revolution and at a particular time therein just after the shutter closes light will fall on the cell and pulse will be transmitted through conductive means which may be connected thereto to provide the synchronizing or timing pulse desired. The various conductors for operation of the same may be led in through a plug receptacle 24 which is attached to block 6 by means of four screws 33 and may be connected to contacts 26, 28 and 30 carried by an insulating plate 32 in the member 24.

I claim:

1. In pulse generating means, a machine part having a definite travel cycle of operation which it is desired to synchronize with associated equipment, a casing for the part having an aperture therethrough, an opaque housing formed of insulating material mounted on said casing adjacent said opening, a source of light in said housing, a light sensitive cell in spaced relation thereto in said housing and opaque blocking means mounted between the light source and the light sensitive means to prevent rays from traveling directly from one to the other and light reflecting means mounted at one point on said machine part to pass the aperture once per cycle to reflect light from the source to the sensitive means and provide a pulse once per cycle for said associated equipment.

2. In pulse generating means to be actuated by a camera shutter which it is desired to synchronize with associated equipment, an opaque housing mounted on said camera adjacent an opening therein over the shutter, a light source and light sensitive cell mounted in spaced relation in said housing, an opaque barrier between the cell and source extending only partway across the housing preventing light rays from falling directly on said cell, and a light reflecting element on the front of the shutter at one point so that as it passes the opening in the case light rays will be reflected on said cell to provide a synchronizing pulse.

ALBERT P. DINSMORE.

REFERENCES CITED

The following references are of record in the file of this patent:

UNITED STATES PATENTS

| Number | Name | Date |
|---|---|---|
| 1,629,727 | Murray | May 24, 1927 |
| 1,872,404 | Case | Aug. 16, 1932 |
| 2,060,500 | Hitchcock | Nov. 10, 1936 |
| 2,254,022 | Whitaker | Aug. 26, 1941 |